(12) United States Patent
Jordan et al.

(10) Patent No.: US 8,996,139 B2
(45) Date of Patent: Mar. 31, 2015

(54) METHOD FOR SYNCHRONIZING TWO CONTROL DEVICES, AND REDUNDANTLY DESIGNED AUTOMATION SYSTEM

(75) Inventors: Carsten Jordan, Erlangen (DE); Michael Unkelbach, Buckenhof (DE)

(73) Assignee: Siemens Aktiengesellschaft, München (DE)

( * ) Notice: Subject to any disclaimer, the term of this patent is extended or adjusted under 35 U.S.C. 154(b) by 1304 days.

(21) Appl. No.: 12/311,386

(22) PCT Filed: Sep. 27, 2007

(86) PCT No.: PCT/EP2007/060281
§ 371 (c)(1),
(2), (4) Date: Mar. 26, 2009

(87) PCT Pub. No.: WO2008/037779
PCT Pub. Date: Apr. 3, 2008

(65) Prior Publication Data
US 2009/0271006 A1 Oct. 29, 2009

(30) Foreign Application Priority Data

Sep. 29, 2006 (EP) .................................. 06020610

(51) Int. Cl.
*G05B 9/03* (2006.01)
*G05B 19/042* (2006.01)
*G05B 19/05* (2006.01)

(52) U.S. Cl.
CPC .......... *G05B 19/0428* (2013.01); *G05B 19/058* (2013.01); *G05B 2219/24186* (2013.01); *G05B 2219/24187* (2013.01); *G05B 2219/25428* (2013.01)
USPC ............................................ 700/20; 700/82

(58) Field of Classification Search
USPC .............. 700/20, 2, 4, 21, 82, 79; 714/11–13, 714/E11.08, E11.081; 709/248
See application file for complete search history.

(56) References Cited

U.S. PATENT DOCUMENTS 5,301,308 A * 4/1994 Daar et al. ...................... 714/12
5,579,220 A * 11/1996 Barthel et al. .................. 700/82
(Continued)

FOREIGN PATENT DOCUMENTS

EP 0394514 A1 10/1990
EP 0636956 A2 2/1995
(Continued)

OTHER PUBLICATIONS

Communication From Japanese Patent Office, dated Dec. 15, 2011, pp. 1-4.
(Continued)

*Primary Examiner* — Sean Shechtman
*Assistant Examiner* — Steven Garland

(57) ABSTRACT

A method for synchronizing a first control device and a second control device of a redundantly structured automation device that controls a technical process is provided. The first control device and the second control device are connected to each other. The first and second devices include functional components which implement the functions that control the technical process. The first control device performs the functions in the functional components for controlling the technical process in cycles, thus creating internal states of the functional components. During control of the technical process by the first control device, information about the internal states of the functional components is transferred, distributed over several cycles, to the second control device. The second control device assigns the transmitted information about the internal states to the functional components. In addition, a corresponding redundantly structured automation device is provided.

16 Claims, 3 Drawing Sheets

(56) References Cited

U.S. PATENT DOCUMENTS

| | | | |
|---|---|---|---|
| 6,170,044 B1 * | 1/2001 | McLaughlin et al. | 711/162 |
| 6,327,670 B1 * | 12/2001 | Hellenthal et al. | 714/5.11 |
| 7,168,075 B1 * | 1/2007 | Barthel et al. | 718/103 |
| 7,496,786 B2 * | 2/2009 | Graham et al. | 714/12 |
| 7,805,541 B2 * | 9/2010 | Zehentner | 710/2 |
| 2006/0174051 A1 * | 8/2006 | Lordi et al. | 710/314 |
| 2007/0168058 A1 * | 7/2007 | Kephart et al. | 700/82 |
| 2008/0098094 A1 * | 4/2008 | Finkelstein et al. | 709/220 |

FOREIGN PATENT DOCUMENTS

| | | | |
|---|---|---|---|
| JP | 56037733 A | | 4/1981 |
| JP | 5134703 A | | 6/1993 |
| JP | 9062304 A | | 9/1997 |
| JP | 2001527232 A | | 7/1999 |
| JP | 200329819 A | | 11/1999 |
| JP | 2003036101 A | | 2/2003 |
| JP | 2006--127514 | * | 5/2006 |
| RU | 2066471 C1 | | 9/1996 |
| RU | 2084011 C1 | | 7/1997 |
| WO | WO 9932947 A1 | | 7/1999 |
| WO | WO 0137058 A1 | | 5/2001 |
| WO | WO 2006083723 | * | 8/2006 |

OTHER PUBLICATIONS

Communication from Japanese Patent Office listing cited references, Dec. 15, 2011, pp. 1-4.
Communication from Chinese Patent Office in English and Chinese, Jan. 27, 2011, pp. 1-7.
Communication from Russian Patent office citing listed references, Mar. 23, 2012, pp. 1-13.

* cited by examiner

METHOD FOR SYNCHRONIZING TWO CONTROL DEVICES, AND REDUNDANTLY DESIGNED AUTOMATION SYSTEM

CROSS REFERENCE TO RELATED APPLICATIONS

This application is the US National Stage of International Application No. PCT/EP2007/060281, filed Sep. 27, 2007 and claims the benefit thereof. The International Application claims the benefits of European Patent Office application No. 06020610.9 EP filed Sep. 29, 2006, both of the applications are incorporated by reference herein in their entirety.

FIELD OF INVENTION

The present invention relates to a method for synchronizing a first control device and a second control device of a redundantly designed automation system for controlling a technical process, wherein the first control device and the second control device are interconnected, each containing a plurality of function blocks by means of which functions for controlling the technical process are implemented. The present invention also relates to a redundantly designed automation system.

BACKGROUND OF INVENTION

Such a redundantly designed automation system for controlling a technical process is used in areas of automation engineering in which heightened requirements are placed on the availability and reliability of the automation system. These are areas in which shutdown of the plant carrying out the technical process would be extremely costly or could be hazardous for the personnel involved or the environment. A redundantly designed automation system of this kind is also termed high-availability. It is employed, for example, in the chemical industry or for operating a power plant. The automation system contains two separately operating control devices with which central functions for controlling the technical process are redundantly designed. Under fault-free conditions, the two control devices usually execute identical programs for controlling the process. These programs contain function blocks by means of which the functions for controlling the technical process are implemented. Such function blocks are e.g. logic functions such as an AND function, arithmetic functions, a counting function, a monitor function with which, for example, a temperature overshoot can be monitored, etc. The function blocks are concatenated or interconnected in the program. The programs and their function blocks are cyclically and synchronously executed, synchronously meaning that internal states of the function blocks occurring when the function blocks are executed are identical in the two control devices. In the case of a counting function with a counter as the function block, the latter's internal state is e.g. a counter reading. Only one of the two control devices is active at any one time, i.e. only the active control device is actually actively controlling the technical process via its output control data. The other control device is in a passive state. In order to keep the passive control device constantly updated with the reading of the active control device, input data is also fed to the passive control device prior to the start of each cycle. This input data usually comes from field units or other in some cases redundant control devices. Such field units, or field devices, are usually external units or devices such as sensors or actuators. In the event of a malfunction in which a fault occurs in one of the control devices, or when one of the control devices is undergoing maintenance, operation is switched from the affected control device to the unaffected control device so that the latter continues to control the technical process.

When the fault has been cleared or maintenance is complete, the shut down control device must be restored to the current reading of the control device currently controlling the technical process. For this purpose, all the internal states of the function blocks of the control device currently controlling the process must also be assigned to the function blocks of the shut down control device. To do this, control of the process is usually interrupted at the start of a particular cycle. During said interruption, all the information about the internal states is transmitted all at once to the shut down control device by the control device that has been controlling the process prior to the interruption. As it takes a certain period of time to transmit the information about the internal states, the program with which the technical process is controlled by the control devices disadvantageously cannot be executed during this period of time. In order to minimize this time, the information about the internal states of all the function blocks is first packed, i.e. aligned together, written to a special memory area and then the packed data is copied to the shut down control device. The start addresses of the information about the internal states assigned to the individual function blocks must be known to the shut down control device. Only thus can it assign the transmitted information about the internal states to its function blocks. In this process, incorrect assignment of the information about the internal states to the function blocks can easily occur.

SUMMARY OF INVENTION

The object of the present invention is to enable two devices of an automation system to be reliably synchronized in a technically simple manner.

This object is achieved with regard to the method and with regard to the device by the independent claims. Advantageous embodiments of the invention can be inferred from the dependent claims.

In the method according to the invention, the first control device cyclically executes its function blocks for controlling the technical process, thereby generating internal states of the function blocks. While the technical process is being controlled by the first control device, information about the internal states of its function blocks is transmitted, distributed over several cycles, to the second control device. The second control device additionally assigns the transmitted information about the internal states to its function blocks.

The inventive redundantly designed automation system for controlling a technical process has a first control device and a second control device which are interconnected, each containing a plurality of function blocks by means of which functions for controlling the technical process are implemented. For their synchronization, the first control device and the second control device are designed such that the first control device cyclically executes its function blocks for controlling the technical process, the function blocks thereby generating internal states. In addition, while controlling the technical process, the first control device transmits information about the internal states of its function blocks, distributed over several cycles, to the second control device. The second control device assigns the transmitted information about the internal states to its function blocks.

According to the present invention, the two control devices are synchronized over a plurality of cycles. The information about the internal states is not fed to the second control device all at once, but in a plurality of transfer operations. This enables sufficiently small amounts of data with information about the internal states to be transmitted from the first to the second control device in the different cycles. The first control device can transmit these small amounts of data in the cycles as well as controlling the technical process, i.e. for the cyclical execution of the different function blocks. It is not necessary for the controlling of the process by the control devices to be interrupted. The data with the information about the internal states can be successively transmitted to the second control device. The amount of data transmitted from the first to the second control device in one of the cycles in addition to controlling the process can advantageously depend on how much capacity the first control device requires for controlling the process and possibly for other tasks that are given a higher priority than synchronization with the second control device. In particular, the control devices represent runtime environments for the function blocks for executing configurable and freely programmable open- and closed-loop control tasks. The function blocks of the first and second control device are in particular of identical form. Internal states of function blocks are, in particular, states or values possessed by the function blocks. The internal states can in particular also include instance information or data containing old values from previous cycles which are summed or integrated over a plurality of cycles. If the internal states of the function blocks of identical form are identical in the two control devices, then the two control devices are operating synchronously.

In an advantageous embodiment of the invention, the information about the internal states of the function blocks of the first control device is transmitted to the second control device prior to execution of the function blocks in the plurality of cycles. This ensures in particular uniform loading of the two control devices. The second control device can therefore assign said transmitted information to the associated function blocks. These function blocks with the assigned, current internal states can be executed at the start of the next cycle.

In another particularly advantageous embodiment, the information about the internal states of the function blocks of the first control device can be transmitted to the second control device together with input data from field units and/or other control devices. This enables information and inputs to be transmitted to the second control device particularly efficiently. Control of the transmission of the required information and inputs can be implemented in a simple manner.

The second control device preferably assigns the transmitted information about the internal states, distributed over the plurality of cycles, to its function blocks. This ensures in particular uniform loading of the second control device.

Particularly preferably, the information about the internal states of the function blocks is transmitted function block by function block. This ensures optimum organization and control of the transmission process. It also enables the second control device to assign the transmitted information block by block to its function blocks, thereby enabling the assignment process to be simplified. Although, the number of function blocks for which the information about their internal states is transmitted is in particular irrelevant here, it must advantageously be ensured that detrimental effects on the cyclical execution of the function blocks due to synchronization are avoided.

In addition, the plurality of function blocks are preferably executed in the plurality of cycles in a predefined runtime sequence and the information about the internal states of the function blocks is transmitted in said predefined runtime sequence. The enables the transmission process to be controlled in a particularly efficient manner.

Particularly preferably, an input value of an input of the function blocks of the first control device is additionally transmitted to the second control device, and the second control device assigns said transmitted input value to an input of one of its function blocks. This ensured particularly reliable and rapid synchronization of the two control devices.

Particularly preferably, the transmitted input value is assigned by the second control device to such an input of one of its function blocks which is connected to an output of another of its function blocks which ranks lower in the predefined sequence than the one of its function blocks, already transmitted information about internal states having been assigned to the one of its function blocks and no information about internal states having been assigned to the other of its function blocks. This enables reliable synchronization to be ensured especially in the case of feedback function blocks. Once synchronized, a function block of the second control device, to which function block the updated internal states have been assigned, therefore remains in synchronism with the corresponding function block of the first control device even if lower order function blocks are not yet synchronized.

The respective function blocks are preferably assigned their own memory areas. The internal state information assigned to the respective function blocks is stored in the memory areas allocated to the respective function blocks, thereby enabling erroneous overwriting of information by other function blocks to be prevented. This also allows particularly free and reliable programming of the function blocks and runtime environments. The separate memory areas are protected in particular by an operating system of the control devices so that pointer overshoots are prevented.

BRIEF DESCRIPTION OF THE DRAWINGS

The invention and its advantages will now be explained in greater detail with reference to examples and exemplary embodiments and the accompanying drawings in which.

DETAILED DESCRIPTION OF INVENTION

Figure 1:
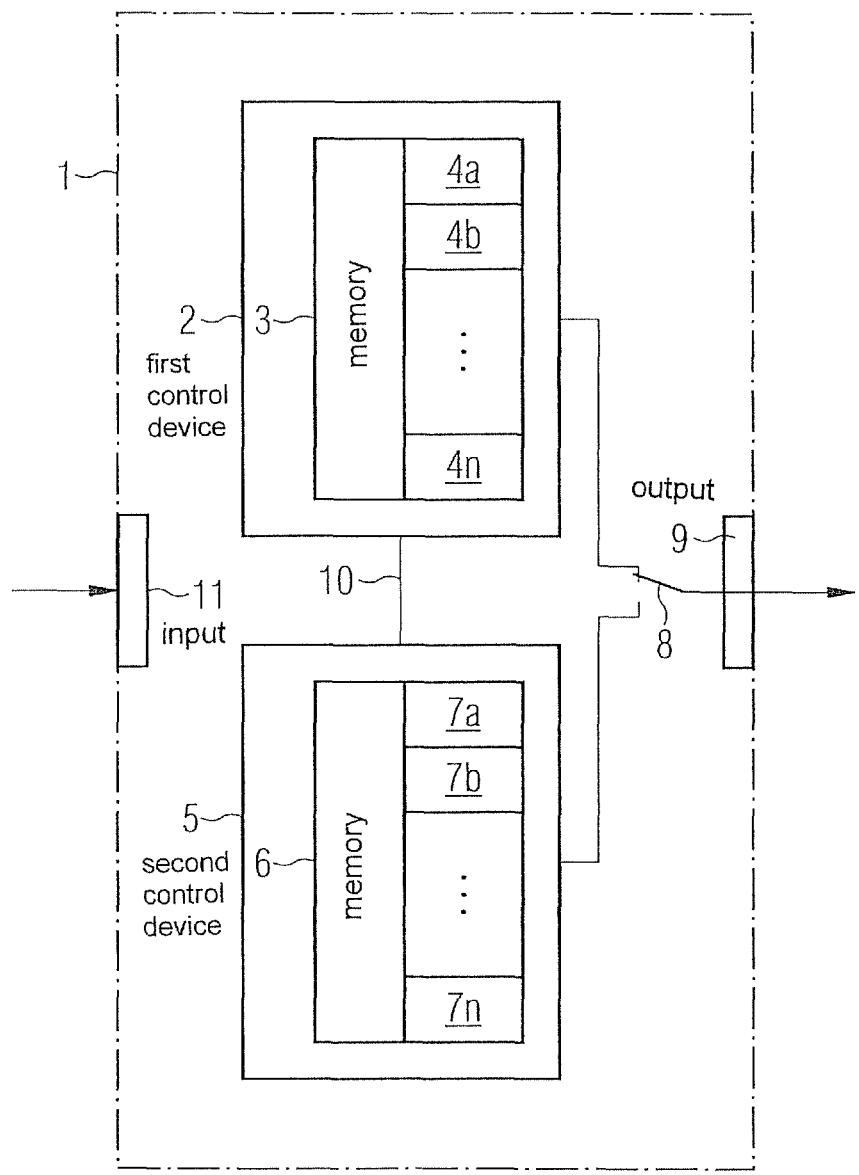
FIG. 1 schematically illustrates a redundantly designed automation system according to the invention, FIG. 2 schematically illustrates a first and second control device of the redundantly designed automation system with non-feedback function blocks and FIG. 3 schematically illustrates the first and second control device with feedback function blocks.

In the Figures, identical or functionally identical elements are—unless otherwise stated—provided with the same reference characters.

FIG. 1 shows a schematic drawing of an inventive redundantly designed automation system 1 for controlling a technical process which is carried out in a plant. Such a plant can be, for example, a power plant or a chemical plant. The automation system 1 contains a first control device 2 which has a memory 3. In the memory 3 a control program is stored which is executed as sequencing control for the controlling of the process by the first control device 2 and in which compiled functions, parameters and other data are contained. The control program contains a plurality of function blocks with which particular sub-functionalities for controlling the process by means of the automation system can be executed. Said function blocks are interconnected in a particular way and exchange data depending on the interconnection. When the control program is executed by the first control device 2, the function blocks assume particular internal states. The memory 3 is subdivided into different memory areas 4a-4n.

Said memory areas 4a-4n are allocated to the different function blocks of the control program, each of the function blocks being assigned its own memory area 4a-4n which it can access. Information concerning the internal states of the function blocks and other data is stored in the memory areas 4a-4n.

The automation system 1 also contains a second control device 5. The design of the second control device 5 essentially corresponds to that of the first control device 2. The second control device 5 contains a memory 6 in which the same control program is stored as in the memory 3. Correspondingly, the memory 6 also contains the plurality of function blocks. The function blocks of the second control device 5 correspond to those of the first control device 2. The function blocks of the two control devices 2, 5 are of identical form. The memory 6 is subdivided into different memory areas 7a-7n. Said memory areas 7a-7n are allocated to the different function blocks of the control program contained in the second control device 5, each of the function blocks being allocated its own memory area 7a-7n which it can access. Information concerning the internal states of the function blocks and other data is stored in the memory areas 7a-7n. In addition to the two control devices 2, 5 the automation system can have further, possibly identically designed control devices.

The two control devices 2, 5 represent runtime environments with which open- and closed-loop control tasks for controlling the technical process can be carried out. The automation system is redundantly designed by means of the two control devices 2, 5. During normal operation, the two control devices 2, 5 are identically configured and execute the identical programs contained in them in parallel, the function blocks being executed cyclically. During normal operation, the function blocks of the two control devices 2, 5 assume identical states at each point in time. The two control devices 2, 5 operate synchronously and are therefore able to control the process. The automation system 1 controls the two control devices 2, 5 such that one of them is switched active. Active in this context means that the control device switched active is actually controlling the process, i.e. output data generated by it is fed out to the plant to be controlled. The other control device is then switched passive, i.e. the passive control device executes the control program, but the output data which it generates in doing so is not forwarded to the plant. In the exemplary embodiment according to FIG. 1, the first control device 2 and the second control device 5 are connected to a switch 8 via which either an output of the first control device 2 or an output of the second control device 5 can be connected to an output 9 of the automation system 1. The automation system 1 is connected via the output 9 to the plant to be controlled.

The first control device 2 and the second control device 5 are interconnected via a communication line 10. The two control devices 2, 5 can exchange data with one another via said communication line 10. In particular, the two control devices 2, 5 can transmit information about the internal states of their respective function blocks to the other control device 2, 5 via the communication line 10, thereby enabling the automation system 1 to keep its two control devices 2, 5 in synchronism.

The communication line 10 is also used to synchronize the two control devices 2, 5 should one of the control devices 2, 5 have to be shut down, e.g. in the event of a fault or for necessary maintenance, etc. In such a case, only one of the two control devices 2, 5 executes the control program. The internal states of the function blocks of the other, shut down control device do not then coincide with the internal states of the function blocks of the control device continuing to operate normally, even when the fault has been repaired or maintenance is complete. To re-synchronize the two control devices in order to transfer the internal states of the normally operating control device to the shut down control device, information about the internal states can be transmitted via the communication line 10 to the other control device.

The latter then stores the transmitted information in the memory areas of its memory. If one of the two control devices 2, 5 has been shut down, the current internal states of the undisconnected, normally operating control device are inventively transmitted incrementally, distributed over several cycles of execution of the function blocks, via the communication line 10 to the disconnected control device.

The automation system 1 has an input 11 via which it is connected to field devices, such as sensors and actuators, and other automation or control devices. At the input 11, the automation system 1 receives signals and data transmitted from these units and devices which are fed to the two control devices 2, 5. This takes place in each case prior to the start of the cycles for executing the function blocks.

Figure 2:
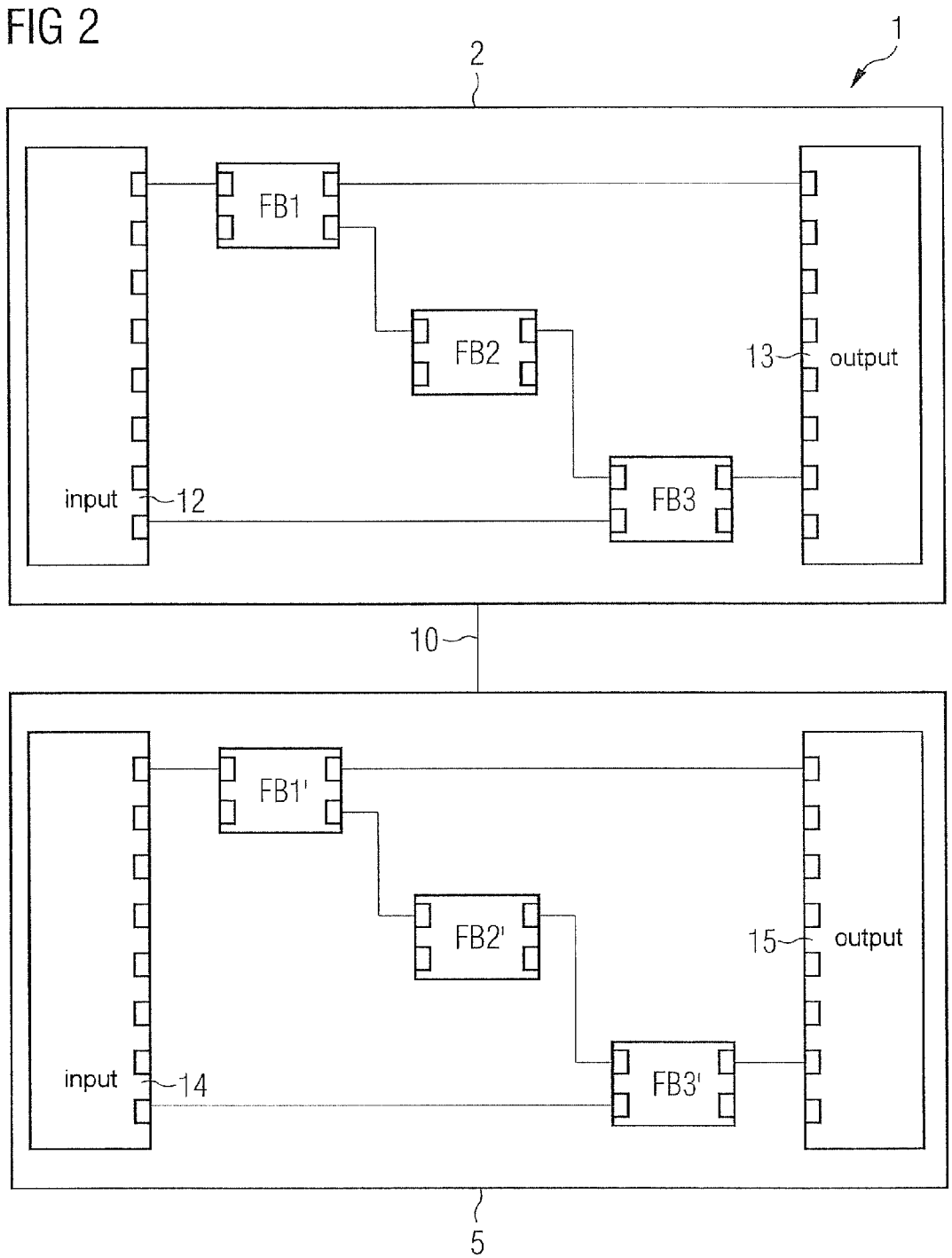

FIG. 2 schematically illustrates the first control device 2 and second control device 5 of the redundantly designed automation system 1. In simplified form, the first control device 2 here has three function blocks FB1, FB2 and FB3 which are interconnected. The first control device 2 also has an input 12 where it receives input data from field devices and/or other control devices or automation systems. For outputting data, an output 13 of the first control device 2 is connected to the field devices and/or the other control devices or automation systems. It is also connected to the switch 8. The input 12 is connected to an input of the function block FB1 and to an input of the function block FB3. An output of the function block FB1 is connected to the output 13, and another output of the function block FB1 is connected to an input of the function block FB2. An output of the function block FB2 is connected to another input of the function block FB3. The function blocks FB1, FB2 and FB3 are here interconnected in series and without feedback. In this context, feedback means that an output of a subsequent function block in the execution sequence of the function blocks FB1, FB2, FB3 is routed to the input of a previous function block.

The second control device 5 is of analogous design to the first control device 2. The second control device 2 therefore has three function blocks FB1', FB2' and FB3' which are interconnected. The second control device 5 has an input 14 where it receives input data from field devices and/or other control devices or automation systems. Said input data can also be transmitted from the first control device 2 to the second control device 5 via the communication line 10. For outputting data, an output 15 of the second control device 5 is connected to the field devices and/or the other control devices or automation systems. It is also connected to the switch 8. The input 14 is connected to an input of the function block FB1' and to an input of the function block FB3'. An output of the function block FB1' is connected to the output 15, and another output of the function block FB1' is connected to an input of the function block FB2'. An output of the function block FB2' is connected to another input of the function block FB3'. The function blocks FB1', FB2' and FB3' are here interconnected in series and without feedback.

The first control device 2 is here the active control device which controls the technical process. The second control device 5 is switched passive and has been shut down, e.g. for a number of hours, due to a fault which has occurred. During normal operation of the first control device 2 for controlling the process, the function blocks FB1, FB2, FB3 are sequentially and cyclically executed, said function blocks FB1, FB2, FB3 assuming internal states which change in each cycle executed.

Due to the fact that the second control device 5 has been shut down, and therefore its function blocks FB1', FB2', FB3' have not been executed, their internal states are not up to date. By incrementally updating the internal states of the function blocks FB1', FB2', FB3', the latter are synchronized with the function blocks FB1, FB2, FB3, proceeding here in the cyclical processing or execution sequence.

In the present example, prior to the first cycle the input data from the field devices and/or the other control devices or automation systems is transmitted from the first control device 2 to the second control device 5 via the communication line 10. Information about the internal state of the function block FB1 is additionally transmitted from the first control device 2 to the second control device 5 via the communication line 10 prior to the first cycle. This information about the internal state is then assigned to the function block FB1' by the second control device 5, whereupon the first cycle then starts in the two control devices 2, 5, the function blocks FB1 and FB1' being executed. As the internal states of the two function blocks FB1 and FB1' have been pre-synchronized and the same input data is fed to the two function blocks FB1 and FB1', the outputs of the two function blocks FB1 and FB1' or their output data are identical after the first cycle. As the input data for the two function blocks FB1 and FB1' is always identical even in subsequent cycles, it is also not asynchronous in these subsequent cycles. With identical input data, the internal states of the two function blocks FB1 and FB1' will also arise identically in the future. The function blocks FB1 and FB1' no longer need to be synchronized in subsequent cycles.

Prior to a second cycle, in addition to the input data, information about the internal state of the function block FB2 is also transmitted from the first control device 2 to the second control device 5 via the communication line 10. Said transmitted information about the internal state is then assigned to the function block FB2' by the second control device 5, whereupon the second cycle then starts in the two control devices 2, 5, the function blocks FB2 and FB2' being executed. As the internal states of the two function blocks FB2 and FB2' are pre-synchronized and identical input data is fed to the inputs of the two function blocks FB2 and FB2', the outputs of the two function blocks FB2 and FB2' or their output data is identical after the second cycle. The two function blocks FB2 and FB2' also remain synchronous in subsequent cycles. With identical input data of the two control devices 2, 5 and pre-synchronized function blocks FB1 and FB1', the internal states of the two function blocks FB2 and FB2' will also arise identically in the future. The function blocks FB2 and FB2' no longer need to be synchronized in subsequent cycles.

The same applies to the synchronizing of the function blocks FB3 and FB3' in a subsequent third cycle in which information about the internal state of the function block FB3 is transmitted from the first control device 2 via the communication line 10 to the second control device 5 and assigned by the latter to the function block FB3'. After the third cycle, all the function blocks of the first control device 2 and second control device 5, and therefore the two control devices themselves, are synchronized. The second control device 5 is therefore able to assume control of the technical process. The information transmitted by the first control device 2 about the internal states of its function blocks FB1, FB2, FB3 is stored by the second control device 5 in the memory areas 7a-7n allocated to the function blocks FB1', FB2', FB3'.

Figure 3:
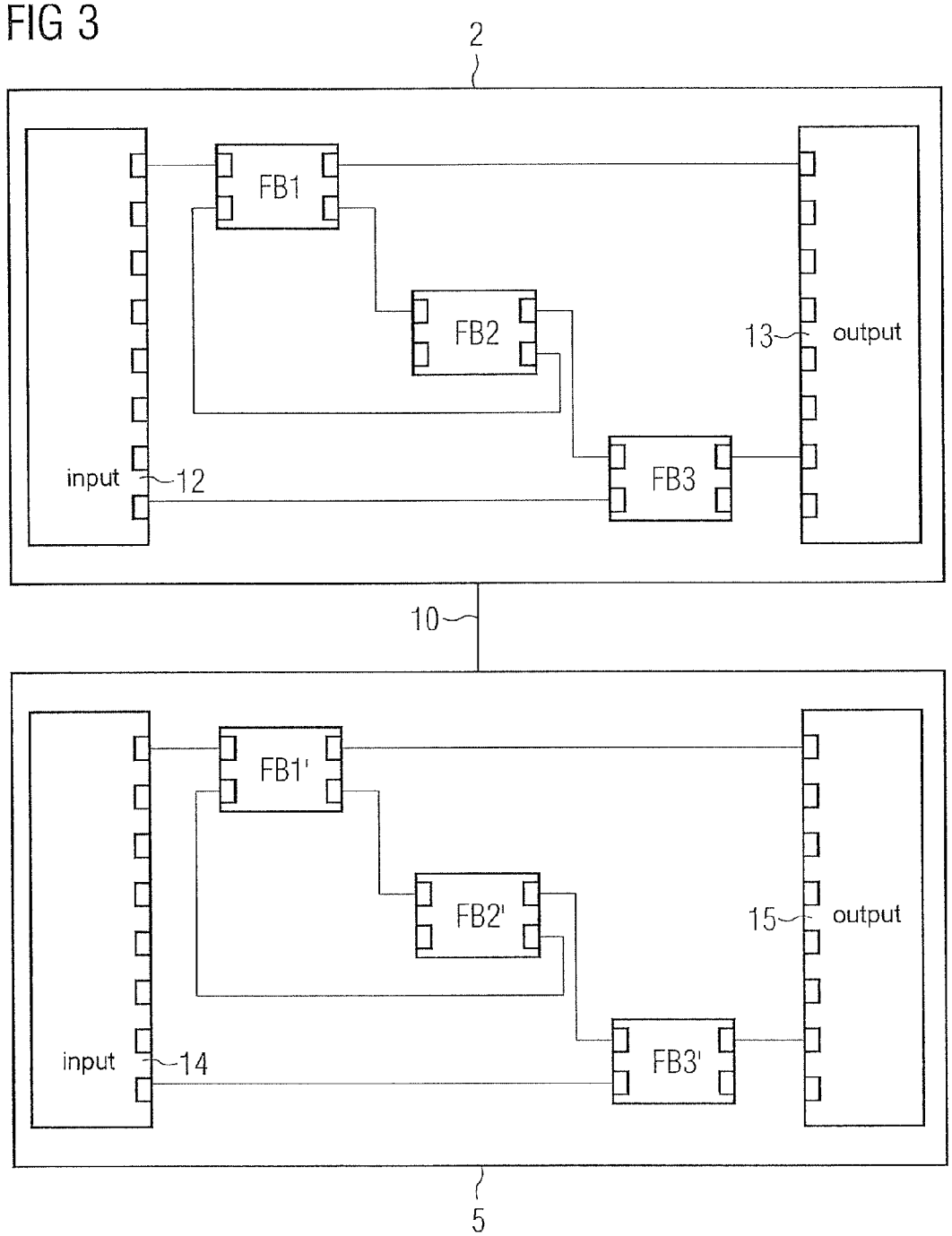

FIG. 3 shows another schematic drawing of the first control device 2 and second control device 5 of the redundantly designed automation system 1. Although the design of the control devices 2, 5 is largely analogous to that of the control devices in the example in FIG. 2, the interconnections of the function blocks FB1 and FB2 and FB1' and FB2' are different. In the present example, feedback connections are present. An output of the function block FB2 is connected to an input of the function block FB1 and, correspondingly, an output of the function block FB2' is connected to an input of the function block FB1'. For successive synchronizing of the function blocks of the two control devices 2, 5 the problem therefore arises that, in spite of transmission and assignment of information about the internal state of the function block FB1 to the function block FB1', the input data fed to the inputs of the function blocks FB1 and FB1' is different because of the feedback and the different internal states of the two function blocks FB2 and FB2'. After the first cycle, the two function blocks FB1 and FB1' are therefore again asynchronous.

In order to avoid this, for synchronizing the function blocks, in addition to the input data from the field devices and/or the other control devices or automation systems as well as the information about the internal state of one of the function blocks FB1, FB2, FB3, input values for the inputs of the function blocks FB1', FB2', FB3' are also transmitted from the first control device 2 to the second control device 5 via the communication line 10 which are connected via a feedback connection to outputs of a lower order function block in the runtime or execution sequence. In the example in FIG. 3, input values of the function block FB1 input connected to the function block FB2 output are therefore transmitted. These transmitted input values are then assigned by the second control device 5 to the function block FB1' input connected to the function block FB2' output. In this way, the two control devices 2, 5 can be synchronized in a simple manner even in the case of feedback in the interconnection of the function blocks.

It is also possible for the input values for the function blocks of the shut down control device 5 always to be transmitted, and in addition to the information about the internal states of the active control device 2. Synchronization can be advantageously optimized in the case of feedback by only transmitting input values for such inputs of already synchronized function blocks, said inputs being connected via a feedback connection to a function block that has not yet been synchronized.

The invention described can also be advantageously used when individual function blocks are not executed in each cycle. Even in this case, the execution cycle is repeated after a particular number of basic cycles.

Completely object-oriented programmed control devices or runtime environments can be synchronized with components as function blocks for which data and internal states are encapsulated and accesses are only possible via defined interfaces. In such a case, the function blocks provide interfaces by means of which the control device or runtime environment can read out the synchronization data and transmit and assign it to the function block to be synchronized.

The invention claimed is:
1. A method for synchronizing a first control device and a second control device of a redundantly designed automation system controlling a technical process, comprising:
providing a plurality of function blocks which implement a plurality of functions for controlling the technical process, the plurality of function blocks each provided to the first and second control devices;

cyclically executing the plurality of function blocks of the first control device which controls the technical process, thereby generating an internal state for each function block;

transmitting, over a plurality of cycles, information including the internal state of each function block of the first control device to the second control device while the technical process is being controlled by the first control device, the transmitting during each of the plurality of cycles including only a portion of all the internal states;

assigning transmitted information about the internal state of each function block of the first control device to a corresponding function block of the second control device, wherein the first control device and the second control device are interconnected, wherein an input value of an input of the plurality of function blocks of the first control device is transmitted to the second control device, wherein the second control device assigns a transmitted input value to an input of one of the plurality of function blocks of the second device, wherein the second control device assigns the transmitted input value to an input of a first function block of the second control device, wherein the input is connected to an output of a second function block of the second control device that is of a lower order than the first function block of the second control device in a predefined runtime sequence, and wherein the first function block has already been assigned information and the second function block has not been assigned information.

2. The method as claimed in claim 1, wherein the information is transmitted to the second control device in the plurality of cycles prior to a start of an execution of the plurality of function blocks.

3. The method as claimed in claim 1, wherein the transmitted information further includes an input data from a field unit and/or a different control device.

4. The method as claimed in claim 1, wherein the second control device assigns, distributed over the plurality of cycles, the transmitted information to each corresponding function block.

5. The method as claimed in claim 1, wherein the information is transmitted one function block at a time.

6. The method as claimed in claim 1, wherein the plurality of function blocks are executed in the plurality of cycles in a predefined runtime sequence and the information is transmitted in the predefined runtime sequence.

7. The method as claimed in claim 1, wherein each function block is allocated a memory area which comprises the internal state information assigned to the respective function block.

8. The method as claimed in claim 1, wherein the first control device and the second control device are connected to a switch that controls which device is an active device and is controlling the technical process.

9. A redundantly designed automation system controlling a technical process, comprising:
a first control device;
a second control device interconnected to the first control device;
a plurality of first function blocks for the first control device;
a plurality of second function blocks for the second control device;
a first internal state information for each function block of the first control device; and
a second internal state information for each function block of the second control device,
wherein the plurality of function blocks implement a functionality that controls the technical process,
wherein the first control device and the second control device are configured for a synchronization,
wherein the first control device cyclically executes a plurality of first function blocks for controlling the technical process, thereby generating the internal state of each function block,
wherein, while the technical process is being controlled, the first control device transmits, distributed over a plurality of cycles, the first internal state information to the second control device, whereby only a portion of first internal state information is transmitted in each cycle,
wherein the second control device assigns the transmitted first internal state information to a corresponding function block of the second control device,
wherein an input value of an input of the plurality of first function blocks of the first control device is transmitted to the second control device,
wherein the second control device assigns the transmitted input value to an input of one of the plurality of second function blocks of the second device,
wherein the second control device assigns the transmitted input value to an input of a first function block of the second control device,
wherein the input is connected to an output of a second function block of the second control device that is of a lower order than the first function block of the second control device in a predefined runtime sequence, and
wherein the first function block having already been assigned information and the second function block having been assigned no information.

10. The system as claimed in claim 9, wherein the first internal state information is transmitted to the second control device in the plurality of cycles prior to a start of an execution of the plurality of function blocks.

11. The system as claimed in claim 9, wherein the transmitted first internal state information further includes an input data from a field unit and/or a different control device.

12. The system as claimed in claim 9, wherein the second control device assigns, distributed over the plurality of cycles, the transmitted first internal state information to each corresponding function block.

13. The system as claimed in claim 9, wherein the first internal state information is transmitted one function block at a time.

14. The system as claimed in claim 9, wherein the plurality of function blocks are executed in the plurality of cycles in a predefined runtime sequence and the first internal state information is transmitted in the predefined runtime sequence.

15. The system as claimed in claim 9, wherein each function block is allocated a memory area which comprises the internal state information assigned to the respective function block.

16. The system as claimed in claim 9, wherein the first control device and the second control device are connected to a switch that controls which device is an active device and is controlling the technical process.

* * * * *